Nov. 10, 1936.   C. C. ROE   2,060,244
GENERATOR
Filed Nov. 16, 1935    2 Sheets-Sheet 1

INVENTOR
C.C.Roe
BY
ATTORNEY

Nov. 10, 1936.　　　C. C. ROE　　　2,060,244
GENERATOR
Filed Nov. 16, 1935　　　2 Sheets-Sheet 2
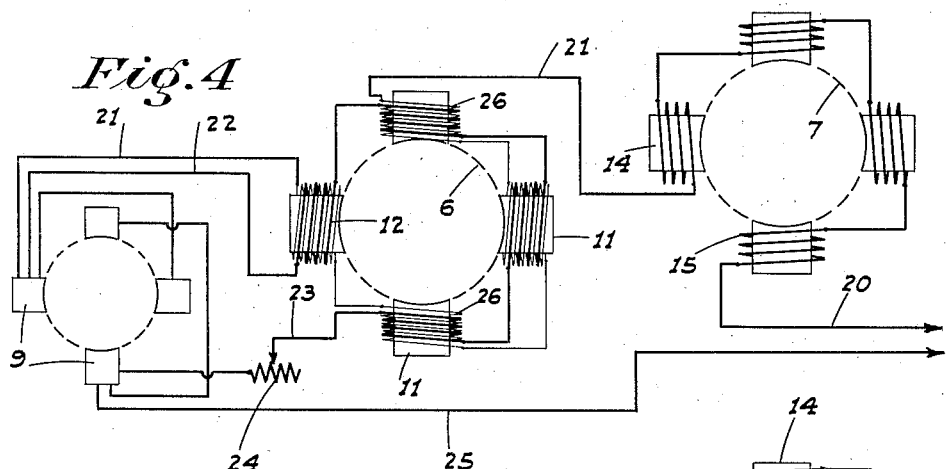
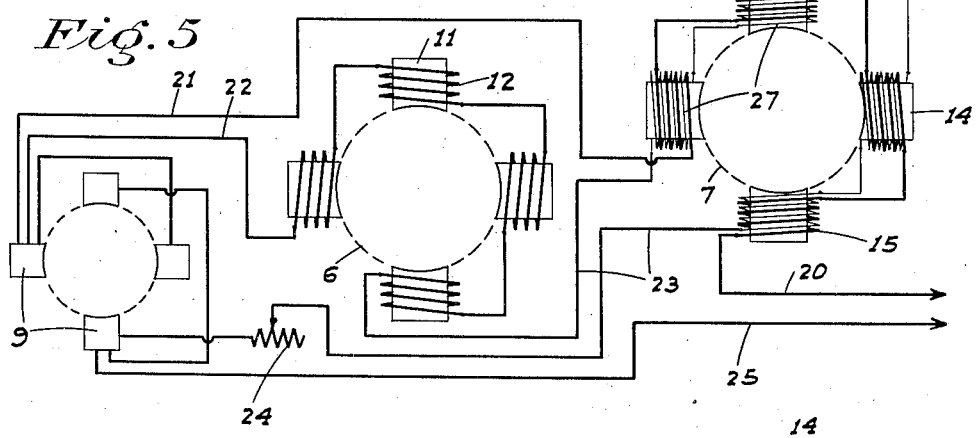
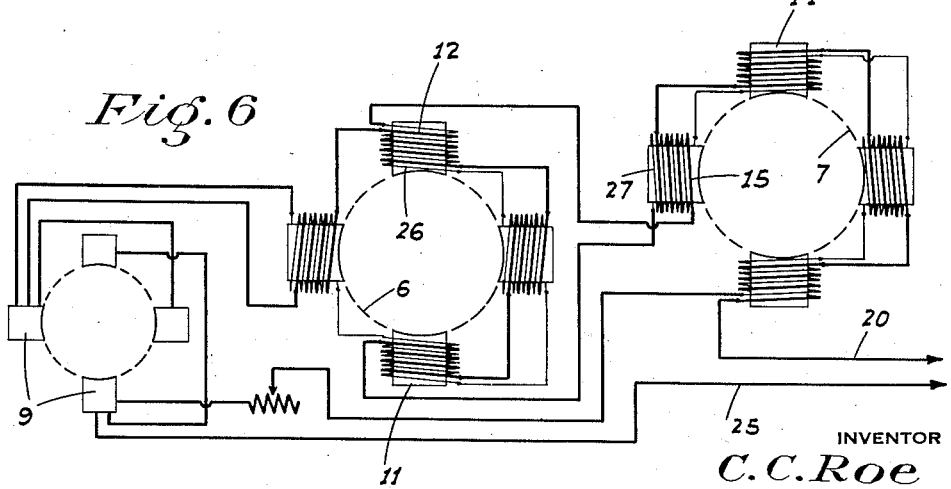
INVENTOR
C. C. Roe
BY
ATTORNEY Patented Nov. 10, 1936

2,060,244

UNITED STATES PATENT OFFICE 2,060,244

GENERATOR

Charles C. Roe, Stockton, Calif., assignor to John F. Knapp, Oakland, Calif., and himself, as trustees Application November 16, 1935, Serial No. 50,164

8 Claims. (Cl. 171—223)

This invention relates to electric generators, my principal object being to provide a generator having current control means incorporated therein which is very efficient, and which avoids the complication of parts and the accompanying expense of manufacture now necessary with present equipment.

Other objects of my invention are to provide a generator so constructed that perfect commutation is had; one which gives a perfect reactor coil effect when used as a welding generator for electric arc welding; and one which may be wound so that a transformer action is obtained, which also is very desirable when the generator is used in connection with electric arc welding.

While my generator has been primarily designed for the above named purpose, it has great utility in various other fields, as will be evident from the description of the generator now to follow.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Fig. 4 is a diagram of the field circuit, showing the stationary shunt coils compound wound.

Fig. 5 is a similar view showing the adjustable series coils compound wound.

Fig. 6 is a similar view showing both sets of coils compound wound.

Figure 1:
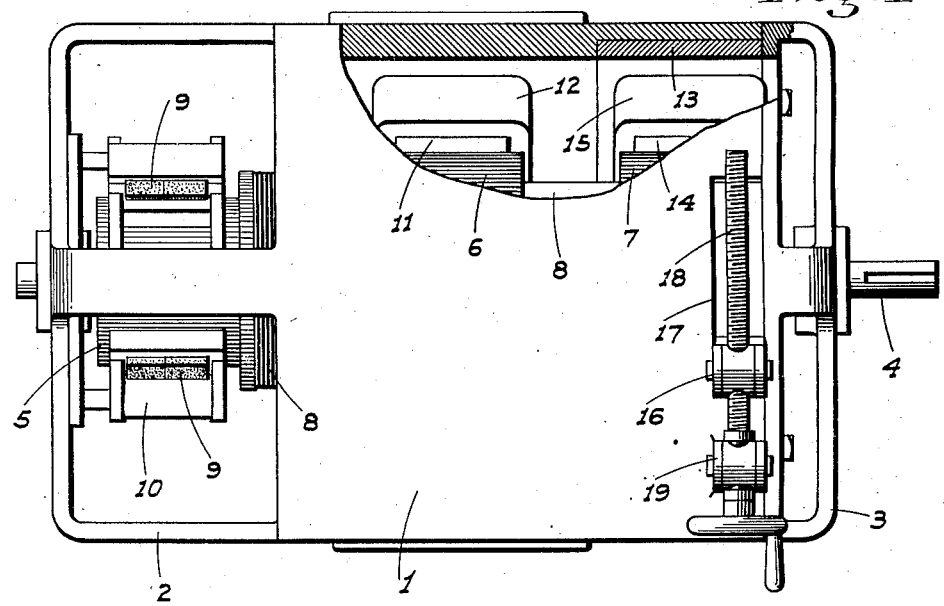
Fig. 1 is a plan of my improved generator partly in section.

Referring now more particularly to the characters of reference on the drawings, the generator comprises a cylindrical shell or frame 1 having spiders 2 and 3 at its ends, which support the armature shaft 4. This shaft is adapted at one end for direct or indirect driving connection to any suitable source of power.

Mounted on the shaft 4 in rigid unitary relation with each other are a commutator 5, a shunt coil armature portion 6 and a series coil armature portion 7. These are arranged in the order given, the armature portions and commutator being separated from each other by non-magnetic spacers indicated at 8. The commutator is exposed between the spider 2 and the adjacent end of the shell and is engaged by brushes 9 mounted in holders 10, these parts being of conventional design and construction.

Projecting inwardly from the portion of the shell 1 adjacent the spider 2 are pole pieces 11 surrounding the armature portion 6 having magnetizing shunt coils 12 associated therewith, as usual. Countersunk and turnable in the shell between the spider 3 and the pieces 11 is a ring 13 forming the supporting frame or pole ring for another set of pole pieces 14. These surround the armature portion 7 and are associated with magnetizing series coils 15.

The ring 13 is held against axial movement between the rim of the spider 3 and the shoulder formed in the shell 1 at the inner end of the ring, as shown in Fig. 1. Said ring is selectively rotated or adjusted by the operator through a predetermined arc in any suitable manner. In the present instance the rotating means is shown as being a radial boss 16 projecting outwardly from the ring 13 through a circumferential slot 17 in the shell 1. A hand screw 18 has threaded connection with the boss 16 and is turnably mounted against axial movement in connection with a boss 19 projecting from the shell 1 beyond one end of the slot. The construction of the generator as a whole is therefore extremely simple, as will be evident.

Figure 2:
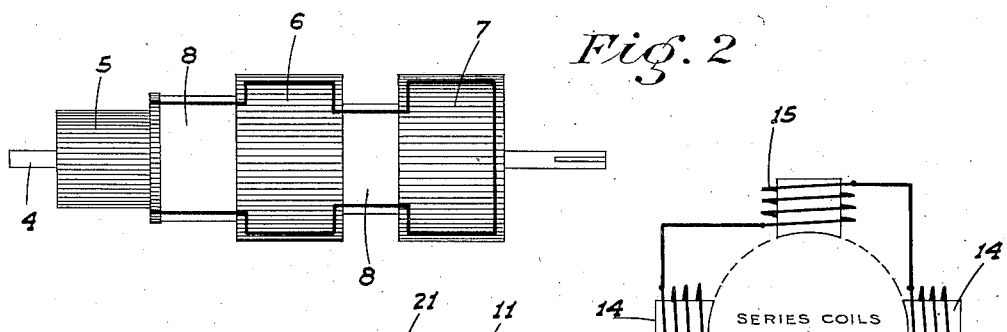
Fig. 2 is a diagrammatic elevation of the armature and commutator unit.
Figure 3:
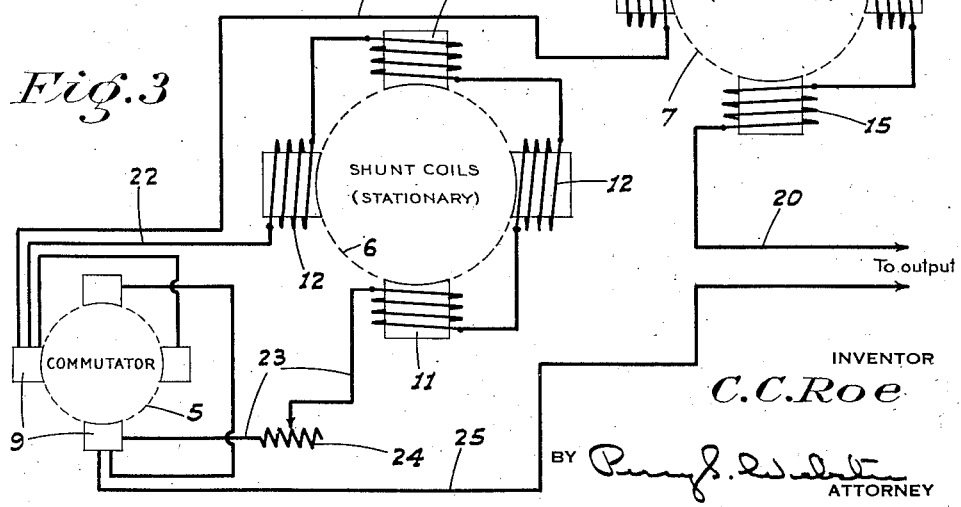
Fig. 3 is a diagram of the field circuit of the generator when wound plain.

The armature portions and commutator are electrically connected together by any suitable form of winding, as indicated in Fig. 2. In the plain field winding of the shunt and series coils, as shown in Fig. 3, the series coils 15 are wired in series with each other, one terminal from one endmost coil in the series being connected to the output lead 20; while the opposite terminal of the other endmost coil in the series is connected to one of the brushes 9 by a wire 21. The shunt coils 12 are also wired in series with each other, one terminal of one endmost coil in the series being connected by a wire 22 to said brush 9. The opposite terminal of the other endmost coil in the series is connected to an adjacent brush 9 by a wire 23 with a rheostat 24 therein; the other output lead 25 being also connected to said adjacent brush 9.

In the circuit arrangement shown in Fig. 4 the wire 21 instead of leading directly to the commutator brush has series coil windings 26 interposed therein which surround the pole pieces 11, in addition to the coils 12, so that the stationary shunt coils are compound wound.

In the circuit arrangement shown in Fig. 5 the wire 23 from the endmost coil 12 is interrupted between said coil and the rheostat 24, and has shunt coil windings 27 interposed therein which surround the pole pieces 14, so that the adjustable series coil unit is compound wound.

In the circuit arrangement shown in Fig. 6 both the adjustable and the stationary coil units are compound wound in a complete circuit; the shunt windings 27 and the series windings 15 forming the compound winding on the adjustable coils, while the series windings 26 and the shunt windings 12 form the compound winding on the stationary coils.

With this construction the control of the current output from the generator is effected by shifting the series coil pole ring 13 and its coils as a unit relative to the stationary coils, either in or opposite to the direction of rotation of the armature.

The theory of operation is that when a north pole of the shiftable series pole ring assembly is in direct line with a south pole of the stationary pole ring, a counter E. M. F. is induced in the portion of the armature which lies under the series poles. Thus when these poles are in this relation the ampere output of the generator drops without other weakening of the shunt coils except such as occurs from the dropping of the voltage at the brushes.

As the series pole ring assembly is shifted in its relation with the shunt pole ring—thus bringing a north pole on the shiftable series pole ring out of alinement with a south pole on the stationary shunt pole ring—this counter E. M. F. effect is diminished, thus raising the current obtained from the generator. This effect continues for ninety degrees of rotation of the shiftable pole ring, or until a north pole on the shifting series pole ring is in alinement with a north pole on the stationary shunt pole ring, at which time the current output is at a maximum.

This is due to the fact that the E. M. F. induced in that portion 7 of the armature which lies under the shifting series pole ring is of the same polarity as that induced in the portion 6 of the armature which lies under the stationary shunt pole ring.

The shifting series pole attached to the shifting series pole ring then acts as an inner or commutating pole, whose position and strength magnetically is varied as the series shifting pole ring is shifted, thus giving perfect commutation. Also the shifting series pole ring assembly gives a perfect reactor coil effect when this generator is used as a welding generator for electric arc welding. This is because it contains all the essentials of a reactor coil, namely, a complete iron magnetic circuit with an air gap, wound with a winding which is in series with the welding circuit.

It should here be noted that when this generator is used for arc welding, the shifting series pole ring is formed of laminated construction in order to give quicker response in current control, and to provide reactance response for the welding circuit.

As previously described in connection with Fig. 4, the stationary shunt-coil poles may be compound wound, the series windings of such poles being used either to buck or build, as the occasion requires, so as to weaken the magnetic strength of the field poles, or to increase the magnetic strength of the stationary shunt poles.

Also the poles of the adjustable pole ring may be compound wound, as described in connection with Fig. 5. The additional shunt winding then provided is used to either increase or decrease the magnetic strength of the shifting series poles, or to polarize them either north or south. If both sets of coils are compound wound, as shown in Fig. 6 a transformer action is obtained which tends to force a rapid change in the voltage in the generator in the case of momentary fluctuations in the amount of current drawn from the generator. This transformer action is most desirable when the generator is used to generate current for electric arc welding.

From the foregoing description it will be readily seen that I have produced such a device as substantially fulfills the objects of the invention as set forth herein.

While this specification sets forth in detail the present and preferred construction of the device, still in practice such deviations from such detail may be resorted to as to not form a departure from the spirit of the invention, as defined by the appended claims.

Having thus described my invention, what I claim as new and useful and desire to secure by Letters Patent is:

1. A single unit generator including an armature winding and commutator, shunt field coils surrounding a portion of the armature, series field coils surrounding a second portion of the armature in longitudinally spaced relation to said first portion, said shunt and series coils being energized by said armature winding, and means to rotate the series coils relative to the shunt coils through an arc of predetermined length.

2. A single unit generator including an armature winding and commutator, shunt field coils surrounding a portion of the armature, series field coils surrounding a second portion of the armature in longitudinally spaced relation to said first portion, said shunt and series coils being energized by said armature winding, and means to rotate the series coils relative to the shunt coils through an arc of predetermined length, said shunt field coils having series windings thereon.

3. A single unit generator including an armature winding and commutator, shunt field coils surrounding a portion of the armature, series field coils surrounding a second portion of the armature in longitudinally spaced relation to said first portion, said shunt and series coils being energized by said armature winding, and means to rotate the series coils relative to the shunt coils through an arc of predetermined length, said series field coils having shunt windings thereon.

4. A single unit generator including an armature winding and commutator, shunt field coils surrounding a portion of the armature, series field coils surrounding a second portion of the armature in longitudinally spaced relation to said first portion, said shunt and series coils being energized by said armature winding, and means to rotate the series coils relative to the shunt coils through an arc of predetermined length, said shunt field coils having series windings thereon and said series field coils having shunt windings thereon.

5. A single unit generator including an armature winding and commutator wherein the armature forms an elongated rotor, consisting of a pair of portions separated lengthwise of the axis of the unit by a non-magnetic spacer, a set of shunt field coils surrounding one of the separate portions of said rotor, a set of series field coils surrounding the remaining separated portion of said rotor, and means to rotate one set of said field coils about the axis of the rotor relative to the other set of field coils, said shunt and series coils being energized by said armature winding.

6. A single unit generator including an armature winding and commutator wherein the armature forms an elongated rotor, consisting of a pair of portions separated lengthwise of the axis of the unit by a non-magnetic spacer, a set of shunt field coils surrounding one of the separate portions of said rotor, a set of series field coils surrounding the remaining separated portion of said rotor, and means to rotate one set of said field coils about the axis of the rotor relative to the other set of field coils, said shunt and series coils being energized by said armature winding, said shunt field coils having series windings thereon.

7. A single unit generator including an armature winding and commutator wherein the armature forms an elongated rotor, consisting of a pair of portions separated lengthwise of the axis of the unit by a non-magnetic spacer, a set of shunt field coils surrounding one of the separate portions of said rotor, a set of series field coils surrounding the remaining separated portion of said rotor, and means to rotate one set of said field coils about the axis of the rotor relative to the other set of field coils, said shunt and series coils being energized by said armature winding, said series field coils having shunt windings thereon.

8. A single unit generator including an armature winding and commutator wherein the armature forms an elongated rotor, consisting of a pair of portions separated lengthwise of the axis of the unit by a non-magnetic spacer, a set of shunt field coils surrounding one of the separate portions of said rotor, a set of series field coils surrounding the remaining separated portion of said rotor, and means to rotate one set of said field coils about the axis of the rotor relative to the other set of field coils, said shunt and series coils being energized by said armature winding, said shunt field coils having series windings thereon and said series field coils having shunt windings thereon.

CHARLES C. ROE.